Dec. 18, 1962 B. G. KING 3,069,500

DIRECT COUPLED PCM REPEATER

Filed Oct. 2, 1961

INVENTOR,
BERNARD G. KING.

BY Harry M. Saragovitz

ATTORNEY.

3,069,500
Patented Dec. 18, 1962

3,069,500

DIRECT COUPLED PCM REPEATER

Bernard G. King, Morristown, N.J., assignor, by mesne assignments, to the United States of America as represented by the Secretary of the Army Filed Oct. 2, 1961, Ser. No. 142,441
6 Claims. (Cl. 178—70)

This invention relates to a pulse-code modulation (PCM) repeater, and more particularly to a direct-coupled PCM repeater.

The information in a PCM signal is conveyed by the presence or absence of particular pulses in a chain. Each pulse must retain its position in time, relative to the other pulses, to be correctly identified and interpreted. Thus, the interpulse time must be held constant. However, if a pulse train travels through a dispersive path such as a transmission line, the pulses are distorted and some interference between pulses is encountered due to the distortion. This difficulty has been overcome by various more or less sophisticated regeneration techniques, none of which have been entirely satisfactory for all purposes.

A PCM repeater designed according to my invention can be considered to comprise two parts: the regenerator which reconstitutes the PCM signal, and the output stage which couples the reconstituted signal to the load. The regenerator of my invention comprises a transistor "and" gate and a transistor "or" gate. The internal impedance of the "and" gate is high, therefore, if the repeater load has a low impedance, an output stage having a high input and a low output impedance must be used to couple the regenerator to the load. In my invention I use a circuit including an emitter follower to couple the reconstituted PCM signal to a transmission line. The output transistors are directly coupled to the regenerator. This direct coupling eliminates the problem of D.C. wander encountered in transformer coupling. Also, the output stage operates to clamp the transmission line at zero volts between input pulses.

A repeater designed according to my invention is small in size and lightweight due to the fact that only transistors and resistors are used. Further, the elimination of the conventional coupling transformer greatly reduces the overall size and bulk of my repeater. Thus, my repeater is ideally suited for use in a miniature cable under-water signal system, and was primarily designed for this type of system. It can be encased in a water-tight housing of very small size to be combined with a small diameter, light-weight cable for rapid laying from a fast boat or an airplane. Of course, my repeater can be used in any PCM system.

Therefore, an object of my invention is to provide a simple PCM repeater.

Another object of my invention is to provide a transistorized PCM repeater.

A further object of my invention is to provide a simple PCM repeater whose output terminals are clamped at zero volts between input pulses.

A still further object of my invention is to provide a simple PCM repeater that comprises a regenerator directly coupled to an output stage.

These and other objects will be apparent from the following description and accompanying drawings, in which.

Figure 1:
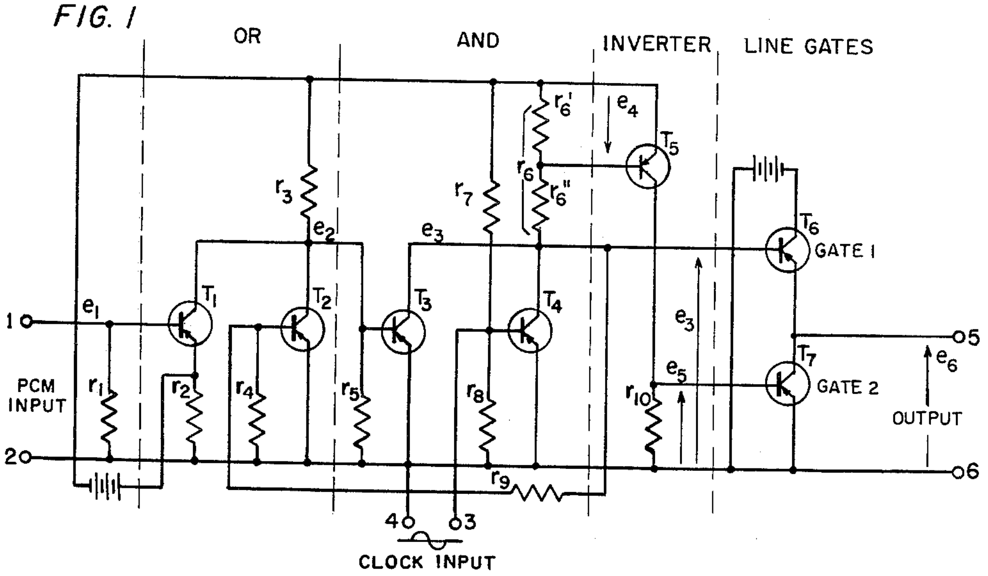
FIG. 1 shows a preferred embodiment of my invention.

Referring to FIG. 1, PCM signals are applied to an "or" gate comprising transistors $T_1$ and $T_2$ via input terminals 1 and 2. The output from the "or" gate is applied to an "and" gate comprising transistors $T_3$ and $T_4$. A clock signal is also applied to the "and" gate via terminals 3 and 4. The output from the "and" gate is applied to a second input of the "or" gate via resistor $r_9$. The circuit thus far described constitutes the regenerator portion of the repeater.

Figure 2:
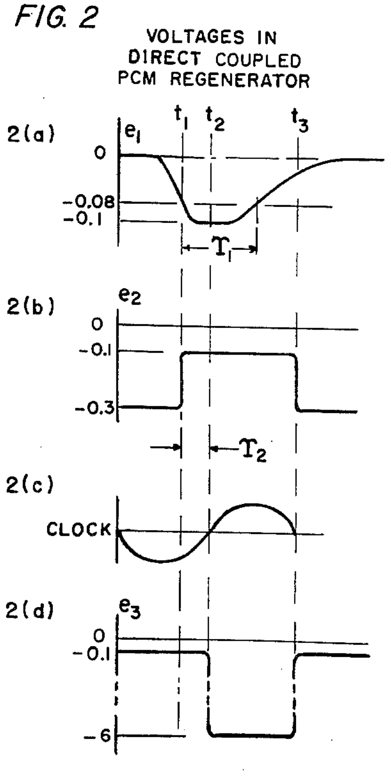
FIGS. 2(*a–d*) show voltages present in the regenerator portion of my invention.

The operation of the regenerator can best be understood by referring to the graphs of FIG. 2.

In the quiescent state transistors $T_1$ and $T_2$ are biased off so that no current flows in the common load resistor $r_3$. When a sufficiently large negative potential is applied to the base of either $T_1$ or $T_2$ the collector voltage $e_2$ rises abruptly and the "or" gate puts out a positive going signal.

"And" gate transistors $T_3$ and $T_4$ are biased to conduct in the quiescent state. The base of transistor $T_3$ is biased into conduction by the combination of resistors $r_3$ and $r_5$ and the base of transistor $T_4$ is biased into conduction by resistors $r_7$ and $r_8$. If the base of either $T_3$ or $T_4$ is brought near zero, it will cease conducting, but because these transistors are saturated, the emitter-collector potential of the other will virtually be unchanged. Thus it is necessary to turn off both transistors to cause the collector voltage $e_3$ to change.

With the foregoing information in mind, the sequence of events as a pulse is formed can now be followed. A negative signal FIG. 2(*a*) is applied to the base of transistor $T_1$. At time $t_1$ this negative potential exceeds the threshold potential and transistor $T_1$ is turned on. Turning on transistor $T_1$ reduces the potential $e_2$, FIG. 2*b*, so that transistor $T_3$ is turned off. This situation continues until time $t_2$ when the potential of the clock signal FIG. 2(*c*) goes to zero. When the clock signal goes to zero transistor $T_4$ is also cut-off. At time $t_2$ when both transistors $T_3$ and $T_4$ are cut-off the common collector voltage $e_3$ increases negatively, FIG. 2(*d*). This is the leading edge of the regenerator output pulse. In order to continue the regenerator output pulse until the clock signal reaches zero again, the "and" gate output signal is applied to the base of transistor $T_2$. Thus, even though the input signal $e_1$ drops below the threshold value, the "and" gate is held open by its own output. At time $t_3$ the clock potential goes to zero again and transistor $T_4$ starts to conduct. When transistor $T_4$ conducts the voltage $e_3$ drops back toward zero, thereby removing the signal from the base of "or" gate transistor $T_2$. The regenerator is now in its quiescent state and the regenerator is ready to receive another input pulse. It is to be understood that under normal operating conditions the input to terminals 1 and 2 would be a pulse train.

The regenerator reconstitutes the PCM signal, both in phase and amplitude. However, it is unsuitable for applying this reconstituted signal to a low impedance load such as a transmission line or cable because of the relatively high impedance of the "and" gate. Thus, as has been previously mentioned, it is necessary to follow the high impedance of the regenerator with an output stage of power amplification which has a high input impedance and a low output impedance. Line gates 1 and 2 are used for this output stage. Transistor $T_6$ of gate 1 is connected as an emitter follower with transistor $T_7$ of gate 2 in series for single-ended output. An inverter stage comprising transistor $T_5$ is interposed between the output of the "and" gate and gate 2 because of the out-of-phase operation of gates 1 and 2. It should be particularly noted that the output stage, gates 1 and 2, are directly coupled to the "and" gate. That is, no transformers are used to couple the "and" gate to the line gates.

Figure 3:
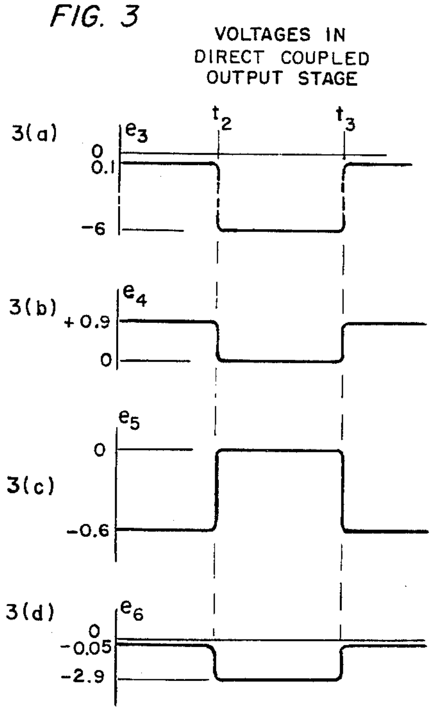
FIGS. 3(*a–d*) show the voltages present in the output stage of my invention.

The operation of the line gates can be followed in detail by reference to the graphs of FIG. 3. The output of the regenerator is about −0.1 volt, FIG. 3(*a*), to earth between pulses. This voltage $e_3$ is applied to the base of emitter follower $T_6$, biasing it out of conduction. During this period the voltage $e_4$ applied to the base of the inverter transistor $T_5$ is about +0.9 volt, FIG. 3(*b*), which is sufficient to bias this transistor into conduction. When transistor $T_5$ is conducting with the +0.9 volt of $e_4$ applied to its base, the voltage drop across load resistor $r_{10}$ is approximately −0.6 volt, FIG. 3(*c*). This −0.6 volt signal, $e_5$, is applied to the base of transistor $T_7$, so that transistor $T_7$ is rendered conductive.

At the leading edge of a pulse ($t_2$), the output of the regenerator drops to −6 volts and transistor $T_6$ is rendered conductive, thereby connecting the output terminals 5 and 6 to power supply $-V_2$, $e_6$ FIG. 3(*d*). Simultaneously, voltage $e_4$ drops to zero and inverter transistor $T_5$ is cut-off. The potential $e_5$ also drops to zero and transistor $T_7$ is cut-off. This condition persists until time $t_3$ when the regenerator output drops to zero. At this time transistor $T_6$ is again cut-off and transistor $T_7$ is rendered conductive. The potential at the output terminals is now nearly zero volts, FIG. 3(*d*).

As was pointed out above, the potential at terminals 5 and 6 is brought to zero between pulses. This is particularly important when the load is a transmission line because the voltage at the open input of a terminated transmission line decays exponentially after a source of potential is removed. Thus line gates 1 and 2 function to couple the output of the regenerator to the load and to clamp output terminals 5 and 6 at zero volts between pulses.

While the embodiment shown and described is a preferred embodiment of my invention other embodiments and modifications will be apparent to those skilled in the art, for example, complementary transistors could be used for gates 1 and 2, thereby eliminating the inverter stage. Therefore, the scope of my invention is to be limited only by the appended claims.

What is claimed is:

1. A pulse code moduation repeater comprising: an "or" gate; input means for coupling pulse code modulated signals to said "or" gate; an "and" gate having a first and a second input and an output; means to couple said first "and" gate input to said "or" gate; means to apply clock input signals to said second "and" gate input; a first line gate connected to the output of said "and" gate; an inverter stage having an input connected to the output of said "and" gate and an output; a second line gate connected to the output of said inverter; and output means connected to said first and second line gates.

2. A pulse code modulation repeater as set forth in claim 1, wherein said "or" gate comprises a first and a second transistor.

3. A pulse code modulation repeater as set forth in claim 1, wherein said "and" gate comprises a first and a second transistor and said inverter comprises a transistor.

4. A pulse code modulation repeater as set forth in claim 1 wherein said first line gate comprises an emitter-follower transistor stage and said second line gate comprises a grounded-emitter transistor stage.

5. A pulse code modulation repeater comprising: a first and second transistor each having a base, a collector and an emitter; said first and second transistor being arranged to operate as an "or" gate; means to apply pulse code modulation input signals to the base of said first transistor; a third and a fourth transistor each having a base, a collector, and an emitter; said third and fourth transistor being arranged to operate as an "and" gate; means to couple the collectors of said first and second transistors to the base of said third transistor; a clock input signal coupled between the emitter of said third transistor and the base of said fourth transistor; means to couple the collectors of said third and fourth transistors to the base of said second transistor; an inverter transistor having a base, a collector and an emitter; means to couple the base of said inverter transistor to the collectors of said third and fourth transistors; an emitter follower output transistor having a base, a collector, and an emitter; means to connect the base of said emitter follower transistor to the collectors of said third and fourth transistors; a second output transistor having a base, a collector, and an emitter; means to connect the base of said second output transistor to the collector of said inverter transistor; and output means connected to the emitter of said emitter follower output transistor and to the collector of said output transistor.

6. A pulse code modulation repeater comprising: an "or" gate having a first and second transistor normally biased to cut-off; a source of pulse code modulation input pulses coupled to said first "or" gate transistor, said input signals causing said first "or" gate transistor to conduct thereby producing an output from said "or" gate; an "and" gate comprising first and second normally conductive transistors; means to couple the "or" gate output to said "and" gate; a source of clock pulses coupled to said "and" gate, said clock pulses and said "or" gate output combining to produce an output from said "and" gate; means coupling the "and" gate output to said second "or" gate transistor, whereby said "or" gate continues to produce an output for a predetermined time after an input pulse has terminated; a pair of output terminals; an inverter transistor coupled to said "and" gate; a first line gate coupled between said inverter and said output terminals; said inverter and said first line gate being arranged to hold said output terminals at zero potential when said "and" gate is in its quiescent state; and a second line gate coupled between said "and" gate and said output terminals, said second gate being arranged to produce an output pulse when said "and" gate produces an output pulse.

No references cited.